(12) United States Patent
Metke et al.

(10) Patent No.: US 8,270,947 B2
(45) Date of Patent: Sep. 18, 2012

(54) METHOD AND APPARATUS FOR PROVIDING A SUPPLICANT ACCESS TO A REQUESTED SERVICE

(75) Inventors: Anthony R. Metke, Naperville, IL (US); Bob D. LoGalbo, Rolling Meadows, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 852 days.

(21) Appl. No.: 11/311,959

(22) Filed: Dec. 19, 2005

(65) Prior Publication Data

US 2007/0143605 A1 Jun. 21, 2007

(51) Int. Cl.
*H04M 1/66* (2006.01)
(52) U.S. Cl. ............... 455/411; 455/410; 726/2; 726/3; 726/4
(58) Field of Classification Search .................. 455/411, 455/410; 713/168, 169, 170, 171, 155; 726/30; 340/518
See application file for complete search history.

(56) References Cited

U.S. PATENT DOCUMENTS

| 6,321,094 | B1 * | 11/2001 | Hayashi et al. ............ 455/517 |
| 7,260,393 | B2 * | 8/2007 | Fnu et al. ................. 455/432.1 |
| 2003/0119489 | A1 * | 6/2003 | Mohammed ............... 455/414 |
| 2004/0044904 | A1 | 3/2004 | Yamazaki et al. |
| 2004/0073793 | A1 | 4/2004 | Takeda |
| 2004/0103282 | A1 * | 5/2004 | Meier et al. ............... 713/171 |
| 2004/0209597 | A1 * | 10/2004 | Myles et al. ............... 455/410 |
| 2004/0248557 | A1 | 12/2004 | Muratsu |
| 2004/0264366 | A1 | 12/2004 | Swami |
| 2005/0125692 | A1 | 6/2005 | Cox et al. |
| 2005/0215234 | A1 | 9/2005 | Fukuzawa et al. |
| 2006/0046691 | A1 * | 3/2006 | Nishio ...................... 455/410 |
| 2006/0165073 | A1 * | 7/2006 | Gopinath et al. ........... 370/389 |
| 2006/0211437 | A1 * | 9/2006 | Yang ........................ 455/518 |
| 2007/0109989 | A1 | 5/2007 | Nakagawa et al. |
| 2007/0143829 | A1 * | 6/2007 | Hinton et al. .................. 726/5 |
| 2007/0264973 | A1 * | 11/2007 | Dowek et al. ............... 455/411 |
| 2007/0280479 | A1 * | 12/2007 | Mousseau ................... 380/270 |
| 2008/0040787 | A1 * | 2/2008 | Aso et al. ..................... 726/11 |
| 2008/0109331 | A1 | 5/2008 | Stadelmann et al. |
| 2008/0127320 | A1 * | 5/2008 | De Lutiis et al. ............... 726/9 |
| 2008/0194231 | A1 * | 8/2008 | Kim et al. ................. 455/411 |
| 2008/0194232 | A1 * | 8/2008 | Muratore et al. ........... 455/411 |
| 2008/0200147 | A1 * | 8/2008 | Nylander et al. ........... 455/411 |
| 2008/0293377 | A1 * | 11/2008 | Pauliac ...................... 455/411 |

FOREIGN PATENT DOCUMENTS

JP 2004135061 A 4/2004
(Continued)

OTHER PUBLICATIONS

PCT/US06/61900, PCT Search Report and Written Opinion, mailed Nov. 9, 2001, 8 pages.

(Continued)

*Primary Examiner* — Kathy Wang-Hurst
(74) *Attorney, Agent, or Firm* — Randi L. Karpinia (57) ABSTRACT

Providing a supplicant access to at least one requested service is described. An authentication request is received, wherein the authentication request comprises an association request and an identifier to a requested service. A relationship between the supplicant and the requested service based on the association request is created. Then, the association request for the requested service is fulfilled and an authentication server based upon the requested service identified in the authentication request is determined. Finally, the supplicant is authenticated for the requested service.

16 Claims, 9 Drawing Sheets

FOREIGN PATENT DOCUMENTS

| | | | |
|---|---|---|---|
| JP | 2004145858 | A | 5/2004 |
| JP | 2004363878 | A | 12/2004 |
| JP | 2005278044 | A | 10/2005 |
| JP | 2005341290 | A | 12/2005 |
| WO | 2005117342 | A1 | 12/2005 |
| WO | 2007076248 | A2 | 7/2007 |

OTHER PUBLICATIONS

PCT/US2006/061900, PCT Preliminary Report on Patentability, mailed Jul. 3, 2008, 6 pages.

Korean Patent Office—Notice of Preliminary Rejection mailed May 26, 2010 (English Translation)—3 pages.

Written Opinion of the International Searching Authority for International Application No. PCT/US06/61900, issued on Nov. 9, 2007.

English Language Translation of Office Action mailed on Apr. 5, 2011 in Japan Patent Application No. 2008-547681.

English Language Translation of Office Action mailed on Apr. 28, 2010 in Korean Patent Application No. 10-2008-7017571.

English language Abstract of Japanese Patent Publication No. JP 2004241911A, European Patent Office, espacenet database—Worldwide (2004).

English language Abstract of Japanese Patent Publication No. JP 2004180010A, European Patent Office, espacenet database—Worldwide (2004).

English language Abstract of Japanese Patent Publication No. JP 2005311527A, European Patent Office, espacenet database—Worldwide (2005).

European European Search Report dated Dec. 12, 2011—8 pages.

\* cited by examiner

METHOD AND APPARATUS FOR PROVIDING A SUPPLICANT ACCESS TO A REQUESTED SERVICE

FIELD OF THE INVENTION

The present invention relates in general to wireless communication networks and in particular to providing authentication to multiple services in wireless communication networks.

BACKGROUND

The Wireless Local Area Network (WLAN) industry has well-established methods that allow mutual authentication between a supplicant and an Authentication Server (AS). Some of the authentication methods used for authentication are also suitable for a supplicant where the supplicant may mutually authenticate without access to the AS server and may authenticate via the use of an Authentication Authorization and Accounting (AAA) server. However, such a method requires an extra entity, namely the AAA server, to perform authentication. Another method for authentication is called Transport Layer Security (TLS) and it relies on the use of public key cryptography and digital certificates. Relying on public key cryptography and digital certificates is cumbersome and inefficient. Another method has been proposed by Institute of Electrical and Electronics Engineers (IEEE) 802.1x and allows for only one relationship between a supplicant and an AS and such a method requires a Port Access Entity (PAE) for authentication. The method is lacking since it does not address issues associated with using a single ad hoc network to support access to independent systems or services. Accordingly, there exists a need to provide a supplicant to a requested service that addresses these shortcomings.

BRIEF DESCRIPTION OF THE FIGURES

The accompanying figures, where like reference numerals refer to identical or functionally similar elements throughout the separate views and which together with the detailed description below are incorporated in and from part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations for providing a supplicant access to a requested service in a wireless communication network. Accordingly, the drawings are illustrated where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for providing a supplicant access to a requested service described herein. The non-processor circuits may include, but are not limited to, a radio receiver, a radio transmitter, signal drivers, clock circuits, power source circuits, and user input devices. As such, these functions may be interpreted as steps for providing a supplicant access to a requested service. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention relates to providing a supplicant access to a requested service. According to an embodiment of the present invention, the function of an authenticator and a Port Access Entity (PAE) to track which services the supplicant is authenticated to is expanded. The present invention also provides an architecture for nodes to authenticate and communicate with each other when away from an authentication server. In one embodiment, the communication between two nodes is facilitated using a Transport Layer Security (TLS) protocol which provides for authentication of nodes.

One embodiment of the present invention allows a node to authenticate with an authentication server through another node. In such an embodiment, each node functions as a supplicant, an authenticator and an authentication server. As will be understood to one of ordinary skill in the art, the authentication server is provided at each node to support and enforce authentication between the supplicant and the authentication server because an authenticator can not perform authentication alone without the aid of the authentication server. Additionally, sometimes ad-hoc networks may not have an authoritative authentication server and hence a location authentication server within the node granting access to a requested service can serve as an authentication server for the node seeking access to the service. The authenticator can keep track of the services the supplicant has authenticated to and can open a PAE port corresponding to the requested service.

Those skilled in the art shall realize that there are several services that may be available to a supplicant and such services are generally termed a "service set." Further, each authenticator that provides access to such services can track the services the supplicant authenticates with. Once the supplicant is authenticated for the requested service, the supplicant can route messages corresponding to the requested service to the authenticator.

Figure 1:
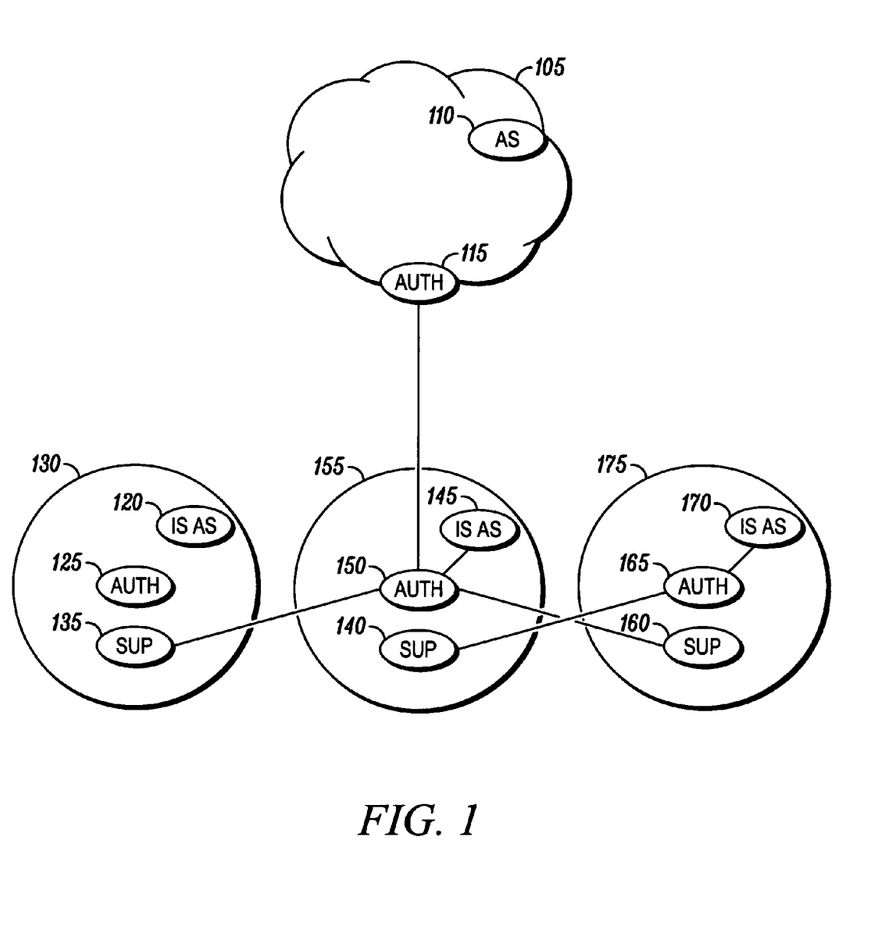
FIG. 1 is a block diagram showing a wireless communication network in accordance with some embodiments of the invention.

FIG. 1 illustrates a block diagram of a wireless communication network pursuant to an embodiment of the present invention. The wireless communication network comprises nodes 130, 155 and 175. As is known to one of ordinary skill in the art, a node (e.g. node 130) can be, for example, a laptop, a mobile phone or a personal digital assistant. Each node (e.g. node 130) comprises an authentication server, an authenticator and a supplicant. For example, node 130 comprises an authentication server 120, an authenticator 125, and a supplicant 135 (as those terms are understood to one of ordinary skill in the art). In one embodiment, the terms authentication server, authenticator, and supplicant are defined in IEEE 802. In one embodiment, authentication servers 120, 145 and 170 in each node 130, 155 and 175 can provide an Incident Scene (IS) network service and a portion of the nodes 130, 155 and 175 can also provide access to infrastructure 105. In one embodiment, the infrastructure 105 comprises an authentication server 110 and an authenticator 115 connected to the authentication server 110. The authenticator 115 corresponding to the infrastructure 105 is also in communication with authenticator 150, which forms a part of node 155. Hence, node 155 can provide a supplicant access to the IS network service as well as to the infrastructure 105.

Each node 130, 155 and 175 generally advertises the services it can offer using a beacon. For example node 155 may offer connectivity to an FBI infrastructure and to an IS network service. Hence, in one embodiment, nodes 130, 155 and 175 include an identifier in the beacons corresponding to the services that the node can provide. One instance of an identifier is a service set identification (SSID) corresponding to a service that the node provides. Authenticators for multiple services for instance authenticator 150, may be pre-configured to use an authentication server corresponding to each service. As is known to one of ordinary skill in the art, various fields and parameters may be used to advertise a specific service and/or a specific authentication server.

Consider two agencies (e.g., the Federal Bureau of Investigation (FBI) and the Local Police Department (LPD)) that agree to interoperate and share information at an incident scene. In such an example, each agency may have nodes, e.g. the FBI may have nodes 130, 155 and the LPD may have node 175. In general, the FBI nodes and the LPD node mutually authenticate each other when there is no link to the infrastructure 105 to serve the incident scene. However, if one of the FBI nodes, e.g. node 155, obtains a wide area link to the FBI infrastructure, then the FBI node may be able to provide access to the FBI infrastructure to the other nodes at the incident scene. For example, if node 130 wishes to now obtain access to the FBI infrastructure at the incident scene, FBI node 155 can provide such access to the incident scene ad-hoc network and the FBI infrastructure.

In one embodiment, to obtain access to the FBI infrastructure, the supplicant 135 of node 130 sends an authentication request to the authenticator 150 of node 155. In one embodiment, the authentication request comprises an association request and an identification corresponding to the requested FBI infrastructure service. The authenticator 150 of node 155 associates the supplicant with the requested service. The authenticator 150 then fulfills the authentication request of the supplicant 135 with the authentication server 110 in the FBI infrastructure (e.g. infrastructure 105). Similarly, node 175 can also obtain access to the FBI infrastructure through node 155. Alternatively, since node 130 has been authenticated for the FBI infrastructure service through node 155, node 130 can also provide access to the FBI infrastructure. The FBI node 155 can then keep track of all such associations for each node using a map. Those skilled in the art shall realize that nodes 130, 175 may also offer access to certain services which node 155 or any other node may wish to seek access to and a similar procedure as disclosed can be followed.

Figure 2:
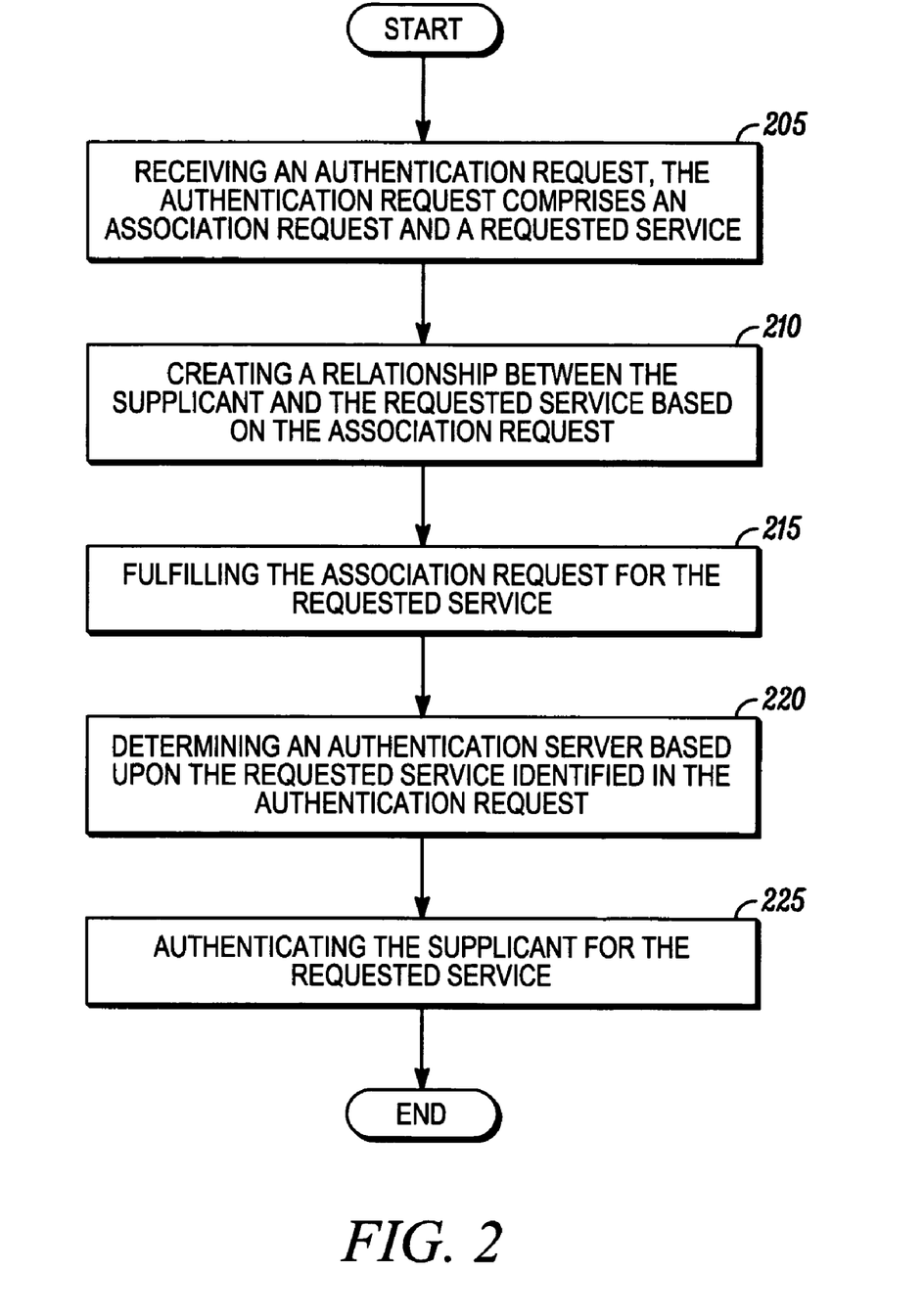
FIG. 2 is a flow diagram showing a method for providing a supplicant access to at least one requested service provided by an authenticator in a wireless communications network in accordance with some embodiments of the invention.

In an embodiment of the present invention, a method for providing a supplicant access to at least one requested service provided by an authenticator in a wireless communications network is provided as shown in FIG. 2. Pursuant to the embodiment, an authenticator receives an authentication request from a supplicant seeking access to a requested service (step 205). In one embodiment, the authentication request comprises an association request and an identifier for the requested service. In one embodiment, the supplicant identifies an authenticator that provides access to the requested service based on examining beacons sent by authenticators that provide services. The authenticator upon receiving the association request creates a relationship between the supplicant and the requested service based on the received association request (step 210). In one embodiment, the relationship is made by creating a map between the supplicant and the requested service and the map is maintained at the authenticator. An identifier for the requested service indicates the requested service, e.g. by an indicator such as a service identification parameter corresponding to the requested service, which is used by the authenticator to associate the supplicant with the requested service.

Having created the relationship between the supplicant and the requested service, the authenticator fulfills the association request for the requested service (step 215). The authenticator then determines an authentication server based upon the requested service identified in the authentication request (step 220). On determining the authentication server, the authenticator routes the authentication request to the authentication server. The authenticator receives an indication from the authentication server that the authentication request from the supplicant for the requested service is successful and receives keying material from the authentication server. In one embodiment, the keying material comprises authentication credentials, secure keys and other information relating to the authentication that enables the authenticator to determine whether the supplicant is authenticated with the authentication server. For example, for IEEE 802.11i authentication, the keying material may be an Authentication Authorization and Accounting (AAA) key or a Pair-wise Master Key (PMK). Finally, the authenticator authenticates the supplicant for the requested service based on the keying material (step 225).

Once the authenticator has authenticated a supplicant for a requested service, the authenticator may keep track of the supplicant's association with the service and the flow of data for the requested service between the supplicant and the authenticator. In one embodiment, the authenticator may receive another authentication request corresponding to another requested service from the same supplicant or from another supplicant. Those skilled in the art shall appreciate that the authenticator can also receive an authentication request from another supplicant corresponding to the requested service or from the same supplicant for another service that the authenticator provides. Referring to FIG. 1, for example, node 155 may obtain an authentication request from node 130 for access to an IS network service and after fulfilling the authentication for the IS network service, node 155 may receive another authentication request from node 130 for access to the FBI infrastructure 105. In one embodiment, while authenticating the supplicant for the second requested service, the authenticator maintains access to the first requested service for the supplicant and on completing authentication for the second requested service, maintains the authentication for requested services the supplicant has authenticated with. Since there may be multiple security associations within one node in a single wireless communication network, there may be multiple PMKs for each node. After authentication, in order to enable the authenticator to associate a message received from the supplicant to the requested service, the supplicant may indicate a security association within the message. In one embodiment, the security association in the message may include using a key identification of the supplicant or a media access control address of the supplicant. As used herein, messages are data packets sent by the supplicant for the requested service and are generally sent after successful authentication.

Figure 3:
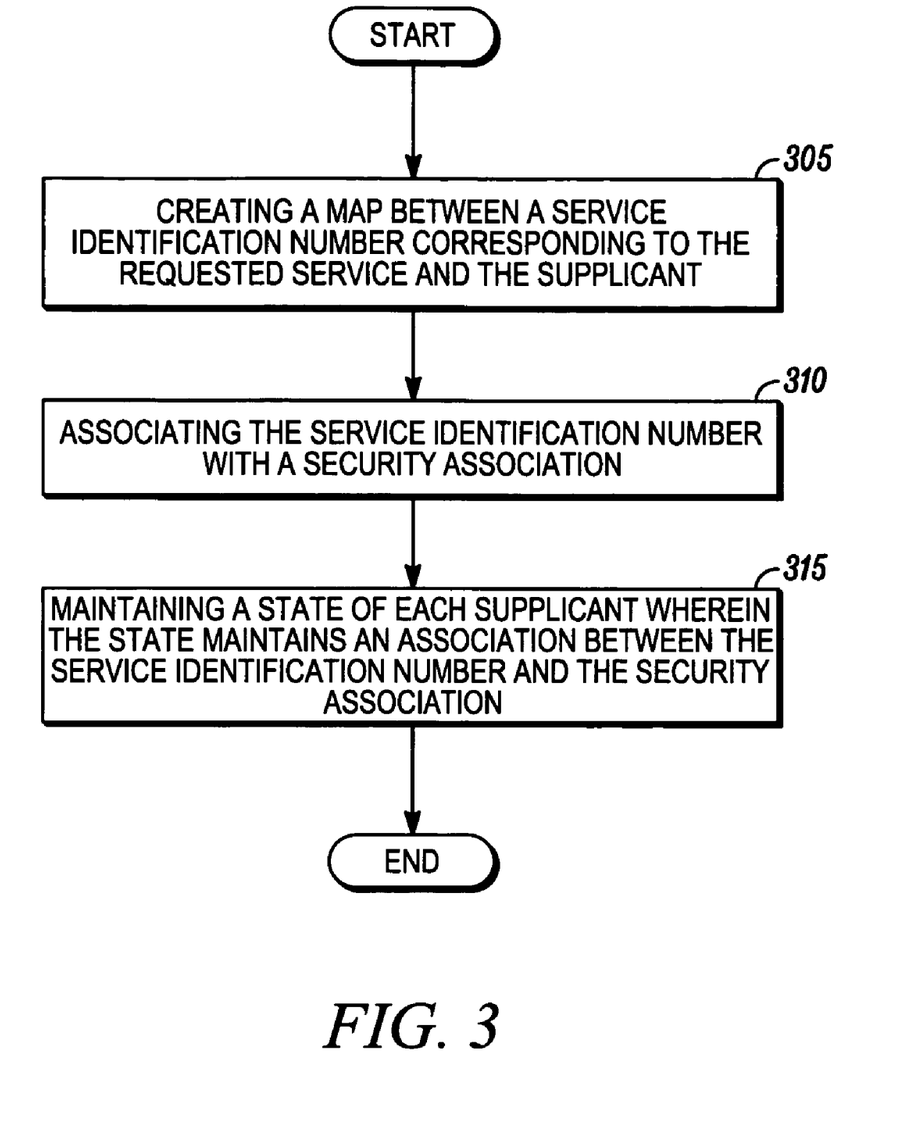
FIG. 3 is a flow diagram depicting a method of creating a relationship between a supplicant and a requested service based on an association request in accordance with some embodiments of the invention.

Turning now to FIG. 3, FIG. 3 shows a flow diagram of a method for creating a relationship between a supplicant and a requested service in accordance with an embodiment of the present invention. On receiving an authentication request, an authenticator may create a map between a service identification parameter corresponding to the requested service specified in the authentication request and the supplicant (step 305). As is known to one of ordinary skill in the art, a device driver or a MAC layer protocol driver, instead of by the authenticator, may also be responsible for creating and maintaining the map. In any case, the map serves to provide an association table between the supplicant and the requested service. The authenticator can then associate the service identification parameter with a security association (step 310) and correspondingly maintain a state of each supplicant (step 315). In one embodiment, the security association generally comprises at least one of a security association index (SAI) number, Virtual LAN identifier and an IP address corresponding to the supplicant. In any case, the state is defined as an association between the service identification parameter and the security association. Further, a state enables routing of messages that are received after authentication to the requested service provided by the authenticator. If the supplicant wishes to disassociate from the authenticator for the requested service, the state can be updated and the map will reflect the disassociation.

Figure 4:
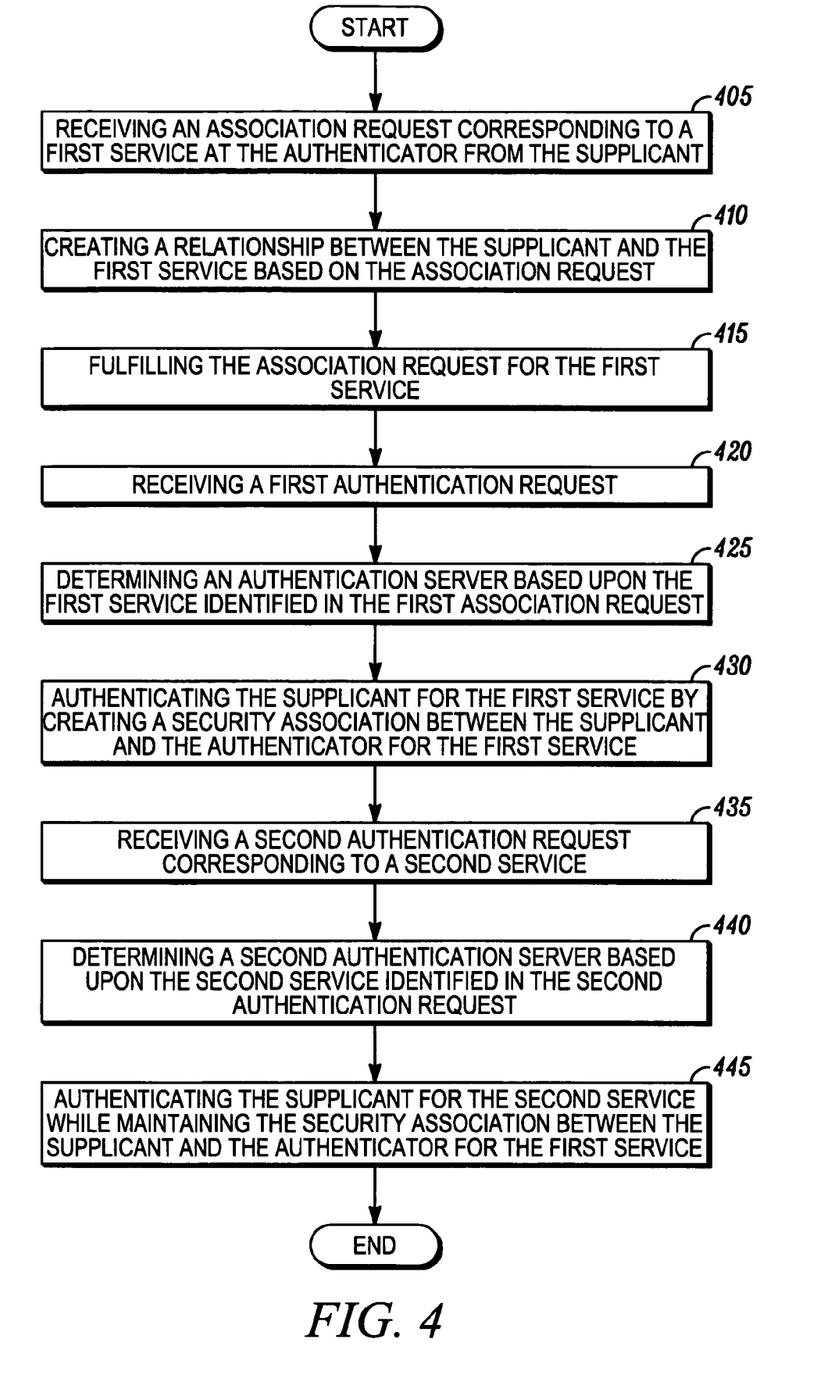
FIG. 4 is a flow diagram showing a method for providing a supplicant access to at least one requested service provided by an authenticator in a wireless communications network in accordance with some embodiments of the invention.

Turning now to FIG. 4, FIG. 4 illustrates another embodiment of a method of providing a supplicant access to at least one requested service provided by an authenticator in a wireless communication network. The method comprises receiving an association request corresponding to a first requested service at the authenticator from the supplicant (step 405). The authenticator upon receiving the association request creates a relationship between the supplicant and the first requested service based on the association request (step 410). In one embodiment, creating the relationship may include creating a map between a service identification parameter corresponding to the requested service and the supplicant, wherein the service identification parameter may be associated with a security association. In any case, once the supplicant is successfully authenticated, the authenticator may maintain a state of each supplicant. Maintaining the state may generally comprise maintaining an association between the service identification parameter and the security association. As mentioned previously, the security association may comprise at least one of a security association index (SAI) number, Virtual LAN identifier and an IP address corresponding to the supplicant.

The authenticator then fulfills the association request of the supplicant for the first requested service (step 415). Fulfilling the association request indicates that the authenticator can provide access to the first requested service for the supplicant and the supplicant can obtain access to the first requested service on fulfilling the authentication. The authenticator then receives a first authentication request corresponding to the first requested service from the supplicant (step 420). The first authentication request comprises an identifier for the first requested service, wherein the identifier may be service identification parameter. The authenticator then determines an authentication server based upon the first requested service indicated in the first authentication request (step 425). In one embodiment, the authenticator receives keying material from the authentication server so that the authenticator can determine whether the supplicant is authenticated with the authentication server for the first requested service. If the authenticator determines that the supplicant is authenticated with the authentication server, then the authentication server fulfills the authentication request for the first requested service. Then, a security association between the supplicant and the authenticator for the first requested service is created and maintained at the authenticator (step 430).

In one embodiment, the authenticator receives a second authentication request from the same supplicant or a different supplicant for a second requested service (step 435). The authenticator determines a second authentication server based upon the second requested service identified in the second authentication request (step 440). The authenticator authenticates the supplicant for the second requested service while maintaining the security association between the supplicant and the authenticator for the first requested service (step 445). Authenticating the supplicant for the second requested service (step 445) comprises the steps of sending an authentication request from the authenticator to the second authentication server where the second authentication server provides the second requested service. The authenticator receives an indication from the second authentication server that the authentication request of the supplicant for the second requested service is successful. The authenticator receives keying material from the second authentication server corresponding to the second requested service so that the authenticator can determine whether the supplicant is authenticated with the second authentication server for the second requested service.

Subsequent to a successful authentication for requested services, all messages corresponding to the requested service can be sent from the supplicant to the authenticator. For example, if a supplicant has successfully authenticated with an IS network service and the FBI infrastructure, the authenticator will allow messages corresponding to both services from the supplicant. However, messages to other services provided by the authenticator but not successfully authenticated by the supplicant will be blocked.

As mentioned, each authenticator in each node can provide access to multiple services. Further, a supplicant from another node can obtain access to the multiple services via the authenticator. As previously mentioned, since there may be multiple security associations within a single node, there can be multiple PMKs. Therefore any message from the supplicant to the authenticator for a requested service that the supplicant has successfully authenticated to can contain the security association corresponding to the requested service. Specifying the security association in the message enables the authenticator to check the map corresponding to the supplicant and determine whether the supplicant has successfully authenticated for the requested service. The authenticator then forwards messages only for those services that the supplicant has successfully authenticated with.

Figure 5:
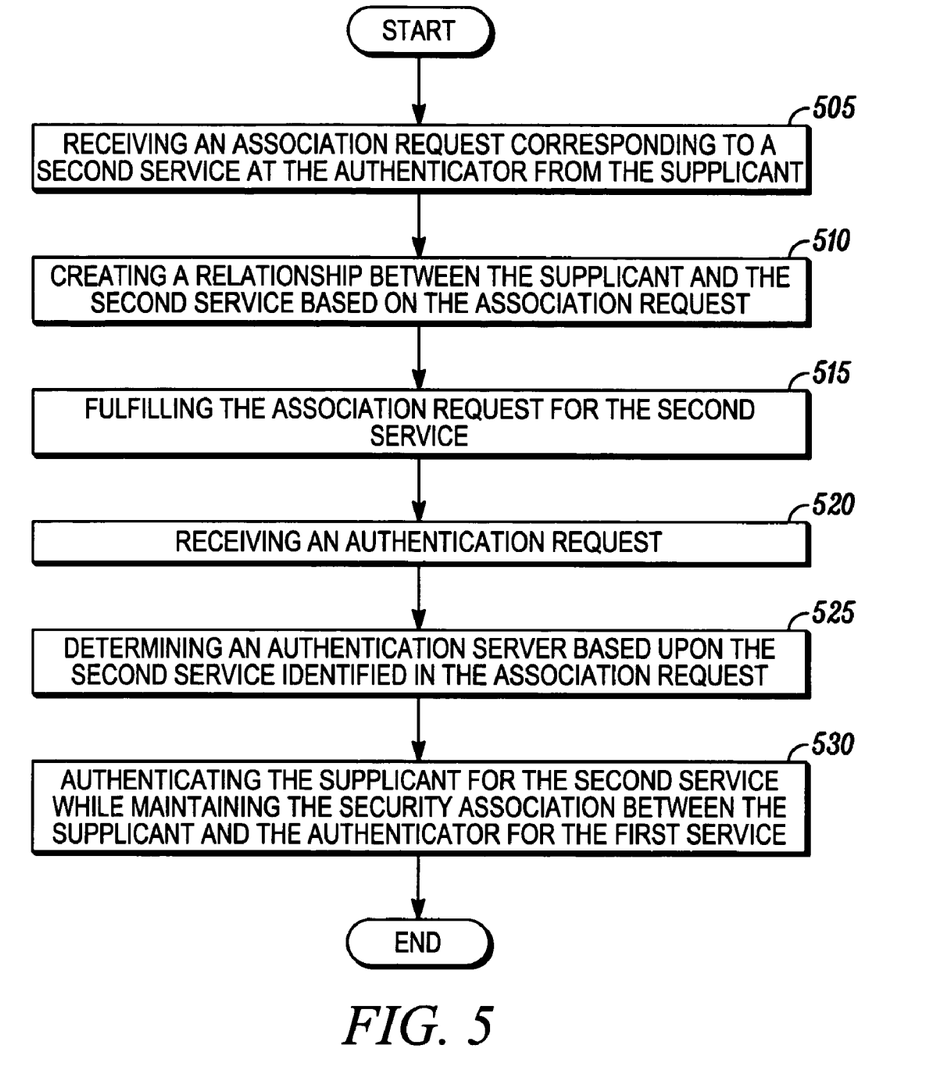
FIG. 5 is a flow diagram showing a method for providing a supplicant access to at least one requested service provided by an authenticator in a wireless communications network in accordance with some embodiments of the invention.

In another embodiment of the present invention a method for providing a supplicant access to at least one requested service provided by an authenticator in a wireless communications network is provided as shown in FIG. 5. The method comprises the steps of receiving an association request corresponding to a second requested service at the authenticator from the supplicant (step 505), wherein the supplicant has already been authenticated for a first requested service. The authenticator creates a security association between the supplicant and the authenticator for the first requested service. In one embodiment, the association request comprises a service identification parameter corresponding to the second requested service. The authenticator in response to receiving the association request corresponding to the second requested service creates a relationship between the supplicant and the second requested service based on the association request (step 510).

In one embodiment, creating the relationship comprises the steps of creating a map between a service identification parameter corresponding to the second requested service and the supplicant, associating the service identification parameter with a security association and maintaining a state of each supplicant. As used herein, the state is defined as an association between the service identification parameter and the security association. As previously mentioned, the security association comprises at least one of a security association index (SAI) number, Virtual LAN identifier and an IP address.

Upon creating the relationship between the supplicant and the second requested service the authenticator fulfills the association request for the second requested service (step 515). Fulfilling the association request for the second requested service step 515 comprises the steps of sending a security association index number corresponding to the association request if the supplicant is eligible for association in an association response or an authentication response. The supplicant then sends an authentication request for the second requested service (step 520). The authenticator upon receiving the authentication request (step 520) determines an authentication server based upon the second requested service identified in the association request (step 525). In one embodiment, the authentication server can also be found via a relay to the authentication server. Upon determining the authentication server the authenticator sends the authentication request to the authentication server where the authentication server provides the second requested service. The authenticator then receives an indication from the authentication server that the authentication request of the supplicant for the second requested service is successful and then receives keying material from the authentication server so that the authenticator can determine whether the supplicant is authenticated with the authentication server. Where the authentication request was relayed via another authenticator, the authentication response may also be received via the same relay. The authenticator authenticates the supplicant for the second requested service (step 530) while maintaining the security association between the supplicant and the authenticator for the first requested service. On successful authentication for the second requested service, the authenticator may also receive more authentication requests for additional services, e.g., a third requested service.

After successful authentication, all messages corresponding to at least one of the first, second and third requested service for which the supplicant is authenticated with the authenticator can be sent from the supplicant to the authenticator. Since there may be multiple security associations within the node in a single wireless communication network, there can be multiple PMKs corresponding to each requested service. Therefore each message may indicate which security association is being used to associate the message with the requested service. Specifying the security association in the message for directing the message to the requested service can be done using a key identification field or a media access control address of the supplicant, as previously mentioned. The security association can also be included in an Initialization Vector/Packet Number (IV/PN) field of a message The method further comprises receiving a message corresponding to a requested service at a first receiving node from at least one transmitting node in the wireless communications network. The first receiving node then determines if the transmitting node has successfully authenticated for the requested service indicated by, e.g. the security association in the message. If not, the authenticator may discard the message. Similarly, if the message comprises an invalid security association the message can also be discarded.

If a first receiving node receives a message corresponding to a requested service not provided by the first receiving node, the first receiving node may forward the message to a second receiving node, if the first receiving node has a security association with the second receiving node for the requested service. In one embodiment, forwarding the message to a second receiving node comprises a) queuing the message at the first receiving node, b) if the first receiving node does not have the security association with the second receiving node, performing an authentication for the requested service with the second receiving node and c) then transmitting the message to the second receiving node after successful authentication with the second receiving node. However, if the first receiving node does not have a security association with the second receiving node for the requested service, then the first receiving node determines a third receiving node where the third receiving node has access to the requested service. The first receiving node then performs an authentication for the requested service with the third receiving node. The first receiving node then forwards the message to the third receiving node. If a receiving node has access to the requested service and a security association with the first receiving node was not found, then the first receiving node can inform the transmitting node.

Figure 6:
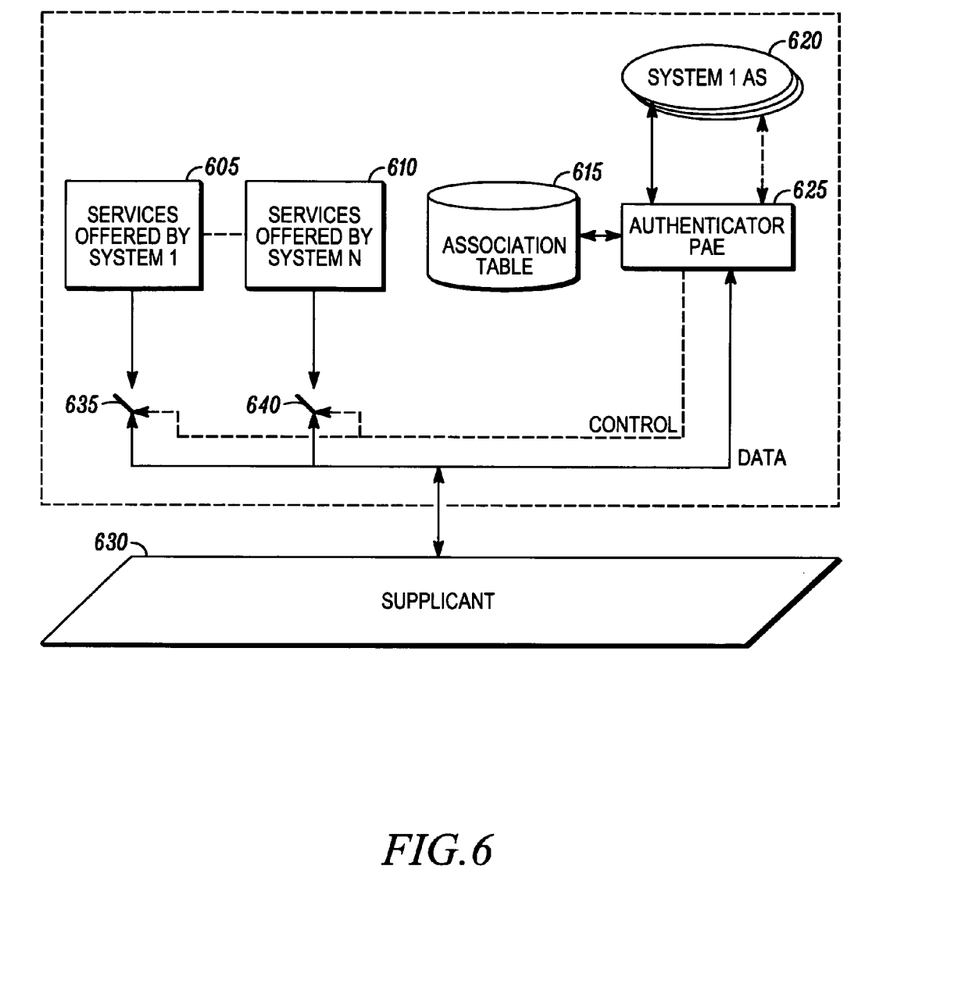
FIG. 6 is a block diagram showing a multi system authenticator in a wireless communication network in accordance with some embodiments of the invention.

Referring now to FIG. 6 shows a block diagram of a multi system authenticator pursuant to an embodiment of the present invention. The multi system authenticator comprises a Port Access Entity (PAE) 625, an association table 615 coupled to the PAE 625 and authentication servers 620, each corresponding to a requested service coupled to the PAE 625. Each of the services offered by "system 1" 605 to "system N" 610 is coupled to the PAE 625 through at least one of a switch and gate. Once a supplicant 630 is authenticated for a requested service by the multi system authenticator, a switch corresponding to the requested service closes. In one embodiment, the PAE 625 can control the switches. The PAE 625 is able to recognize which message is associated with which system based on the information available in the association table 615 wherein the association table 615 comprises a map between a service identification parameter corresponding to the requested service and the supplicant. The authenticator can associate the service identification parameter with a security association and maintain a state of each supplicant using the map. Once the authenticator determines that the supplicant has authenticated for the requested service, the PAE 625 closes the switch, e.g. switch 635, for the requested service, e.g. service 605. Once the switch closes, messages are able to flow through the switch to the requested service.

Figure 7:
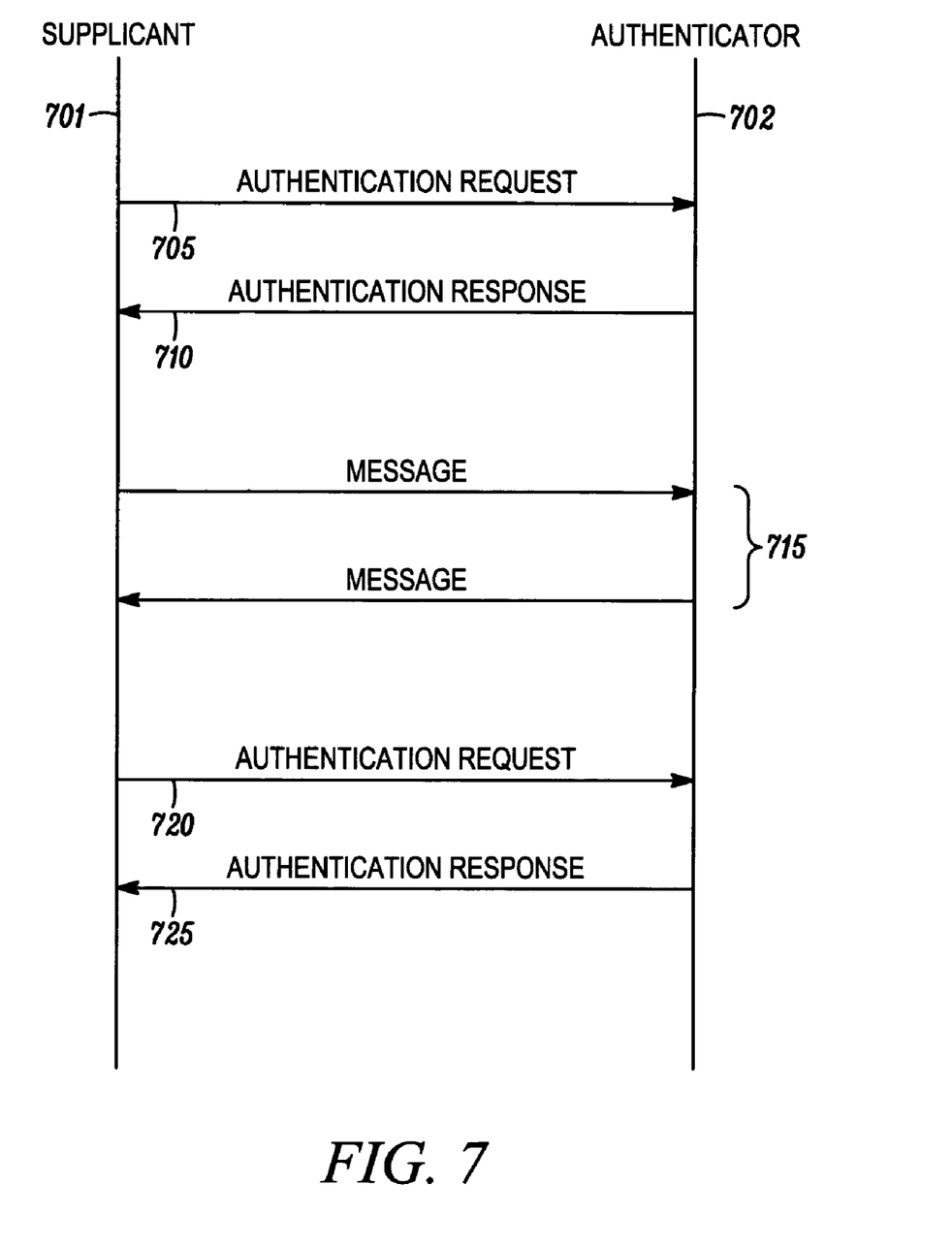
FIG. 7 is a diagram showing communication exchanged between a supplicant and an authenticator for a requested service provided by an authenticator in a wireless communication network in one embodiment of the present invention.

FIG. 7 is a diagram illustrating communication exchanged between a supplicant and an authenticator for a requested service provided by an authenticator in a wireless communication network. In such an embodiment, the functions of authentication and association are achieved simultaneously. Referring to FIG. 7, a supplicant 701 seeking access to a requested service provided by the authenticator 702 sends an authentication request 705. In such an embodiment, the authentication request 705 comprises an association request and an identifier to a requested service. In one embodiment, the identifier is a service identification parameter corresponding to the requested service. As is known to one of ordinary skill in the art, authentication comprises further messaging (not shown) between the supplicant and an AS which traverse through the authenticator 702.

When the authentication is successful (e.g. as described with respect to FIG. 2), the authenticator 702 sends an authentication response 710 to the supplicant 701. In one embodiment, the authentication response 710 comprises a security association, as described above, to inform the supplicant 701 that the authentication has been successful. As is known to one of ordinary skill in the art, verification of the authentication state between the supplicant 701 and the authenticator 702 may be performed e.g. via a four-way handshake. Upon verification of the authentication state, the supplicant 701 may perform messaging 715 with the authenticator 702. Subsequently, the supplicant may send a second authentication request 720 to the authenticator 702 for another requested service. Similarly, when the supplicant receives an authentication response 725 from the authenticator 702, the supplicant may perform subsequent messaging for the second requested service.

Figure 8:
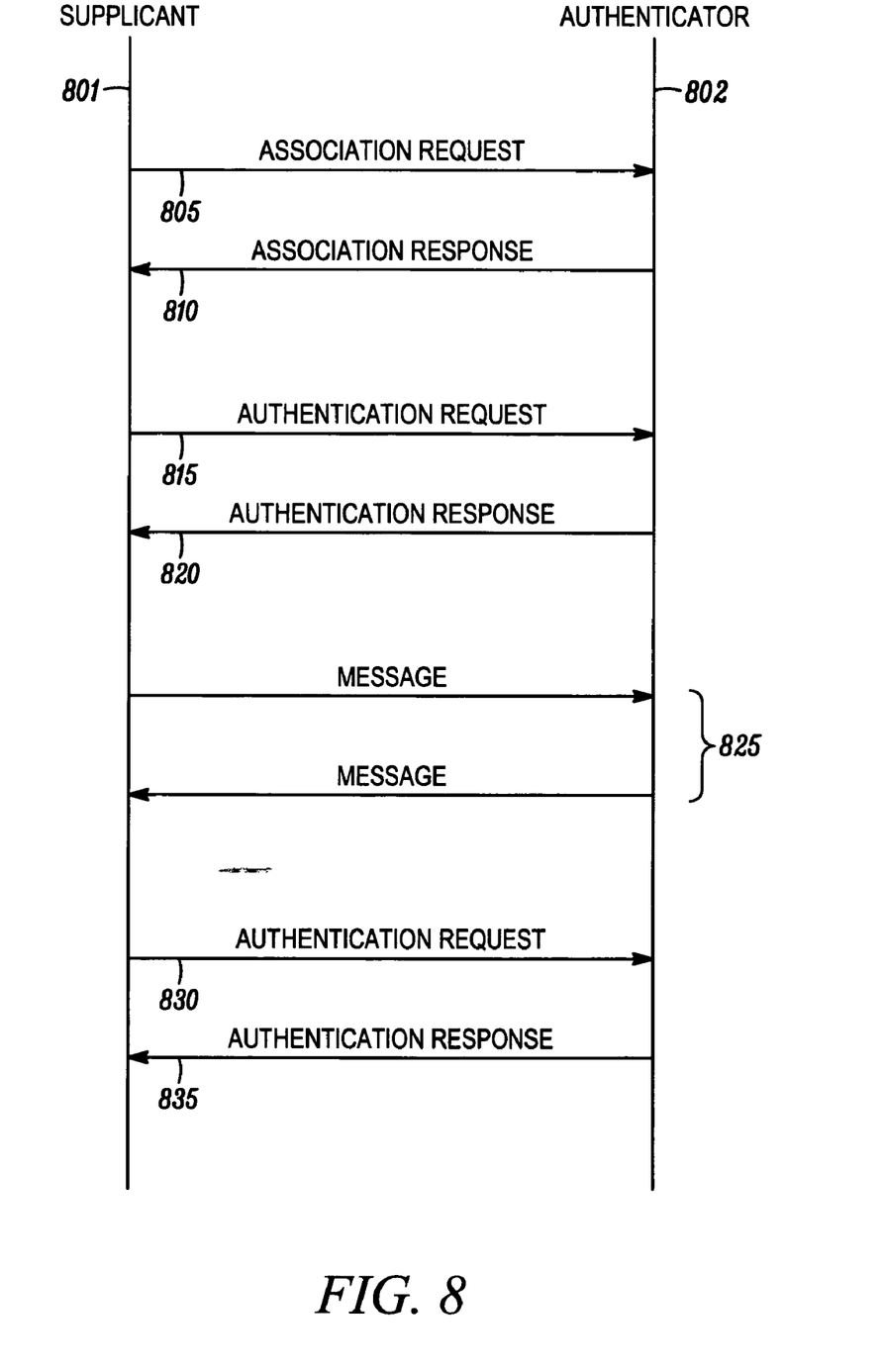
FIG. 8 is a diagram showing communication exchanged between a supplicant and an authenticator for a requested service provided by an authenticator in a wireless communication network in a second embodiment of the present invention.

FIG. 8 is a diagram illustrating communication exchanged between a supplicant and an authenticator for a requested service provided by an authenticator in a wireless communication network. In such an embodiment, the function of association is performed once between a single supplicant and an authenticator, whereas the function of authentication may be performed a number of times. Referring to FIG. 8, a supplicant 801 seeking access to a requested service provided by the authenticator 802 sends an association request 805. In one embodiment, the association request comprises a service identification parameter corresponding to the requested service. When the association is successful and the supplicant has associated with the authenticator 802 for the requested service, the authenticator 802 sends an association response 810 to the supplicant 801. Then, the supplicant sends an authentication request 815 comprising an identifier to the requested service to the authenticator 802. In one embodiment, the identifier is a service identification parameter corresponding to the requested service. As is known to one of ordinary skill in the art and as mentioned above, authentication comprises further messaging (not shown) between the supplicant and an AS which traverse through the authenticator 802. When the authentication is successful, the authenticator 802 sends an authentication response 820 to the supplicant 801. The supplicant 801 may then perform messaging 825 for the requested service. Subsequently, the supplicant may send a second authentication request 830 to the authenticator 802 for another requested service. Similarly, when the supplicant receives an authentication response 835 from the authenticator 802, the supplicant may perform subsequent messaging for the second requested service. In this embodiment, the supplicant did not need to perform association again since the supplicant is already associated with authenticator for any service.

Figure 9:
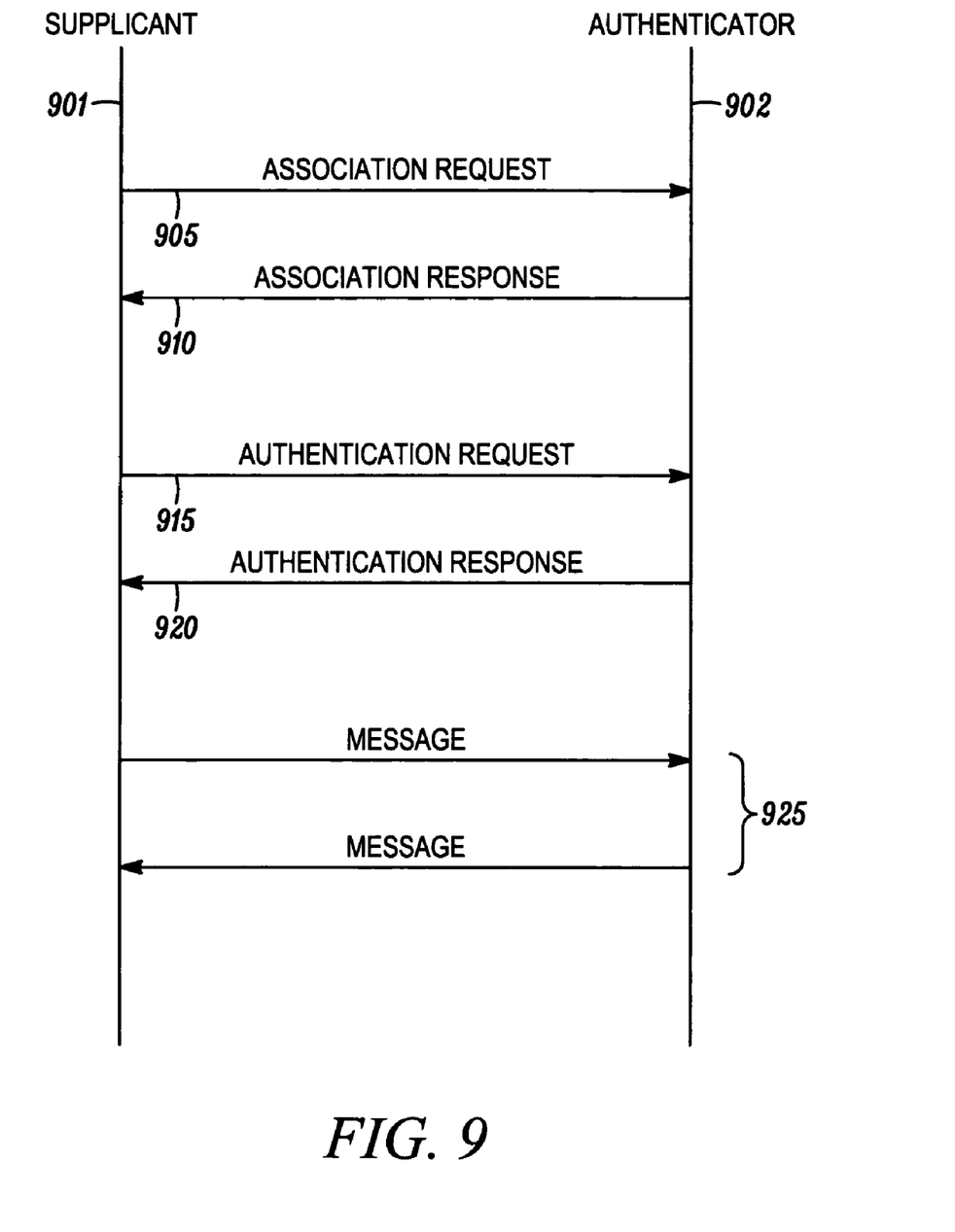
FIG. 9 is a diagram showing communication exchanged between a supplicant and an authenticator for a requested service provided by an authenticator in a wireless communication network in a third embodiment of the present invention.

FIG. 9 is a diagram illustrating communication exchanged between a supplicant 901 and an authenticator 902 for a subsequent requested service provided by an authenticator 902 in a wireless communication network. It is assumed in FIG. 9 that a supplicant 901 has previously associated and/or authenticated with an authenticator 902 for a first requested service, e.g. by the signaling of FIGS. 7 and/or 8, and requests a second requested service. In such an embodiment, the supplicant 901 must perform the steps of association (e.g. via 905, 910) and authentication (e.g. via 915, 920) before engaging in messaging 925. At this point, messaging belonging to any of the previously authenticated services, in addition to the authenticated second requested service, can be forwarded through the authenticator 902.

In one embodiment, as used herein, references to the authentication request and authentication response can be Extensible Authentication Protocol Over Local area network (EAPOL) messages as specified according to IEEE 802.11 standards. In such an embodiment, each of the messages corresponding to the requested service can include a security association index number to enable sorting of messages according to the requested service at the PAE.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method of providing a supplicant access to at least one service offered by an authenticator in a wireless communications network, the method comprising at the authenticator:
   establishing one or more security associations with one or more neighbor nodes upon authenticating the one or more neighbor nodes, wherein each security association corresponds to at least one service set comprising a plurality of services;
   receiving an authentication request from a supplicant corresponding to a service set;
   forwarding the authentication request to an authentication server designated for use when authenticating supplicants for the requested service set via a neighbor node with which the authenticator has a security association corresponding to the requested service set, wherein the authentication server authenticates the supplicant for the requested service set;
   receiving, in response to the forwarded authentication request, an indication corresponding to whether the supplicant has successfully authenticated for the requested service set; and
   creating a security association with the supplicant when the indication corresponds to a successful authentication, for use by the supplicant to communicate with one or more other nodes authenticated for the same service set, wherein the creating step further comprises:
   creating a map between the security association corresponding to the requested service set with the supplicant and the respective security association corresponding to the same service set with one or more other neighbor nodes.

2. The method of claim 1 further comprising:
   specifying the security association in a message for directing the message to the requested service using one of a) a key identification field, b) media access control address of the supplicant and c) an additional field in each message.

3. The method of claim 1, wherein the receiving step further comprises:
   receiving keying material from the authentication server so that the authenticator determines whether the supplicant is authenticated with the authentication server.

4. A method of providing a supplicant access to at least one service offered by an authenticator in a wireless communications network, the method comprising at the authenticator:
   receiving an authentication request corresponding to one of a plurality of services from the supplicant, wherein the authentication request includes an association request and a service identification parameter for at least one of a plurality of requested services;
   forwarding the authentication request to an authentication server where the authentication server authenticates the supplicant corresponding to the authentication request for the requested service;
   receiving, in response to the forwarded authentication request, an indication corresponding to whether the supplicant has successfully authenticated for the requested service;
   repeating the forwarding step and the receiving step, in response to the forwarding step, for a plurality of authentication requests wherein each of the plurality of authentication requests corresponds to one of a plurality of services offered by the authenticator;
   allowing a message corresponding to the requested service from the supplicant when the supplicant corresponding to the authentication request has successfully authenticated to the requested service; and
   creating a map between the requested service and the supplicant based on the received authentication request; and
   associating the service identification parameter corresponding to the requested service with a security association, the security association comprising at least one of a security association index (SAI) number, Virtual LAN identifier and an IP address; and
   maintaining a state of each supplicant wherein the state is an association between the service identification parameter and the security association.

5. The method of claim 4 further comprising:
   specifying the security association in a message for directing the message to the requested service using one of a) a key identification field, b) media access control address of the supplicant and c) an additional field in each message.

6. The method of claim 4, wherein the receiving the indication step comprises:
   receiving keying material from the authentication server so that the authenticator determines whether the supplicant is authenticated with the authentication server.

7. The method of claim 2 further comprising:
   receiving a message corresponding to the requested service at a first receiving node from at least one; transmitting node in the wireless communications network;
   determining if the transmitting node has successfully authenticated for the requested service at the first receiving node indicated by the security association in the received message; and
   forwarding the message to a second receiving node, if the first receiving node has a security association with the second receiving node for the requested service.

8. The method of claim 7, wherein the forwarding step further comprises:
   queuing the message at the first receiving node, if the first receiving node does not have the security association with the second receiving node;
   performing an authentication for the requested service with the second receiving node; and
   transmitting the message to the second receiving node, if the first receiving node has successfully authenticated with the second receiving node for the requested service.

9. The method of claim 7, wherein the forwarding step further comprises:
   determining a third receiving node, if the first receiving node does not have the security association with the second receiving node, the third receiving node having access to the requested service;

performing an authentication for the requested service with the third receiving node, if the first receiving node has not successfully authenticated with the third receiving node;

forwarding the message to the third receiving node, if the first receiving node has successfully authenticated with the third receiving node for the requested service; and informing the transmitting node if a third receiving node was not found.

10. The method of claim 2 further comprising receiving a message corresponding to the requested service at a first receiving node in the wireless communications network; and
discarding the message, if the received message comprises an invalid security association.

11. The method of claim 1, wherein the authenticator server may be found via a relay to the authentication server.

12. The method of claim 1, wherein the authentication request comprises an association request and an identifier for the requested service.

13. The method of claim 4, wherein the authentication request comprises an association request and an identifier for the requested service.

14. The method of claim 1, further comprising at the authenticator:
upon receiving a message from the supplicant over the security association corresponding to the requested service set, allowing the message to be forwarded to a neighbor node over another security association corresponding to the same service set.

15. The method of claim 14 wherein the upon receiving a message step further comprises;
identifying the service identification parameter from the received message, using the map to determine a list of neighbors with which the authenticator has a security association corresponding to the received service identification parameter, allowing the message to be forwarded to one or more neighbors on this list, and forwarding the message to neighbors over security association corresponding to the received service identification parameter.

16. The method of claim 1 wherein the creating a map step further comprises;
assigning a service identification parameter corresponding to the requested service set to the security association corresponding to the same service set, wherein the service identification parameter comprises at least one of a virtual LAN (local area network) identifier, a network address, and a new parameter locally significant to the supplicant and authenticator, and
communicating the service identification parameter to the supplicant.

* * * * *

UNITED STATES PATENT AND TRADEMARK OFFICE
CERTIFICATE OF CORRECTION

| | |
|---|---|
| PATENT NO. | : 8,270,947 B2 |
| APPLICATION NO. | : 11/311959 |
| DATED | : September 18, 2012 |
| INVENTOR(S) | : Metke et al. |

It is certified that error appears in the above-identified patent and that said Letters Patent is hereby corrected as shown below:

On the Title Page, item (56), under "OTHER PUBLICATIONS", in Column 2, Line 2, delete "Nov. 9, 2001," and insert -- Nov. 9, 2007, --, therefor.

In Column 12, Line 43, in Claim 7, delete "one;" and insert -- one --, therefor.

In Column 14, Line 5, in Claim 15, delete "comprises;" and insert -- comprises: --, therefor.

In Column 14, Line 16, in Claim 16, delete "comprises;" and insert -- comprises: --, therefor.

Signed and Sealed this
Fifth Day of February, 2013

Teresa Stanek Rea
*Acting Director of the United States Patent and Trademark Office*